Feb. 18, 1941.     R. SIMMON     2,232,146
PHOTOGRAPHIC ENLARGER
Filed May 10, 1939     3 Sheets-Sheet 1

INVENTOR.
RUDOLPH SIMMON
BY
ATTORNEY.

Feb. 18, 1941.  R. SIMMON  2,232,146
PHOTOGRAPHIC ENLARGER
Filed May 10, 1939   3 Sheets-Sheet 2

INVENTOR.
RUDOLPH SIMMON
BY
ATTORNEY.

Feb. 18, 1941.  R. SIMMON  2,232,146
PHOTOGRAPHIC ENLARGER
Filed May 10, 1939  3 Sheets-Sheet 3
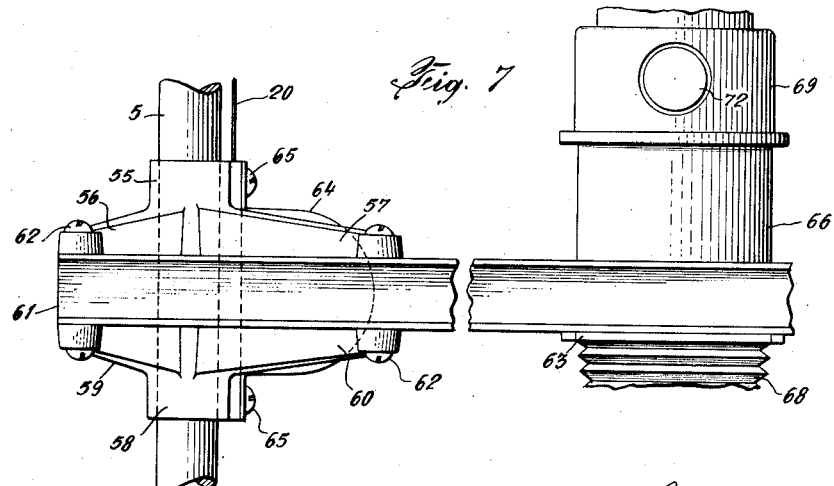
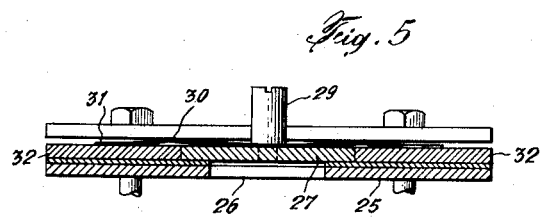
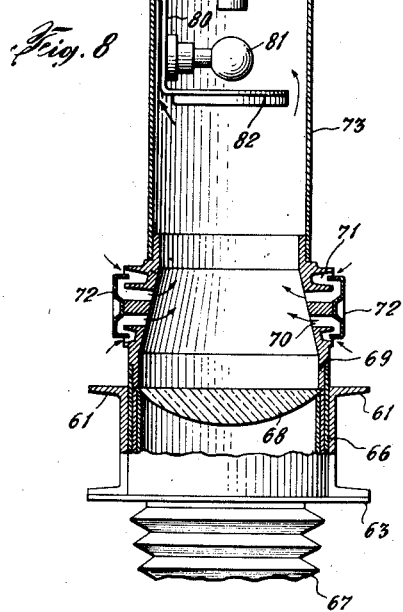
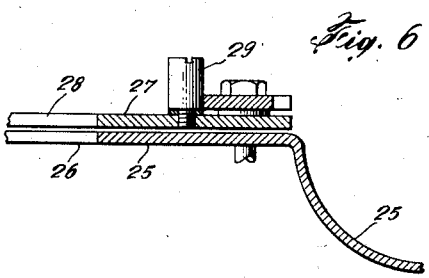
INVENTOR.
RUDOLPH SIMMON.
BY
ATTORNEY.

Patented Feb. 18, 1941

2,232,146

UNITED STATES PATENT OFFICE 2,232,146

PHOTOGRAPHIC ENLARGER

Rudolph Simmon, Long Island City, N. Y.

Application May 10, 1939, Serial No. 272,772

3 Claims. (Cl. 248—123)

This invention relates to photographic enlargers, and more particularly to an improved construction thereof.

In accordance with the present invention, there is provided a base with a standard extending upwardly therefrom and an enlarging head mounted on a suitable support, which support embraces said standard and allows ready movement of the enlarging head upwardly and downwardly. The invention comprises a number of features, among which is included the use of a counterbalance arrangement whereby the weight of the enlarging head is minimized and the operation of the device is thereby facilitated. There is also provided a novel and effective means for clamping film to be enlarged in the apparatus in such a manner as to avoid binding thereof, to facilitate the movement of the film through the apparatus, and to hold the film perfectly flat during the enlarging operation. Various other details constituting part of the present invention will be apparent from the description herein.

In the accompanying drawings, constituting a part hereof and in which like reference characters indicate like parts, Fig. 1 is a side elevational view of an apparatus embodying the present invention, some parts being broken away and other parts being shown in section for clearness;

Fig. 4 is an enlarged plan view of the film holder, some parts being broken away for clearness;

Fig. 5 is a vertical cross-sectional view taken along the line 5—5 of Fig. 4;

Fig. 6 is a vertical cross-sectional view taken along the line 6—6 of Fig. 4;

Fig. 7 is a fragmentary view showing a modification of the means for holding the support on the standard; and Fig. 8 is a vertical cross-sectional view taken through a modified form of enlarging head.

Figure 1:
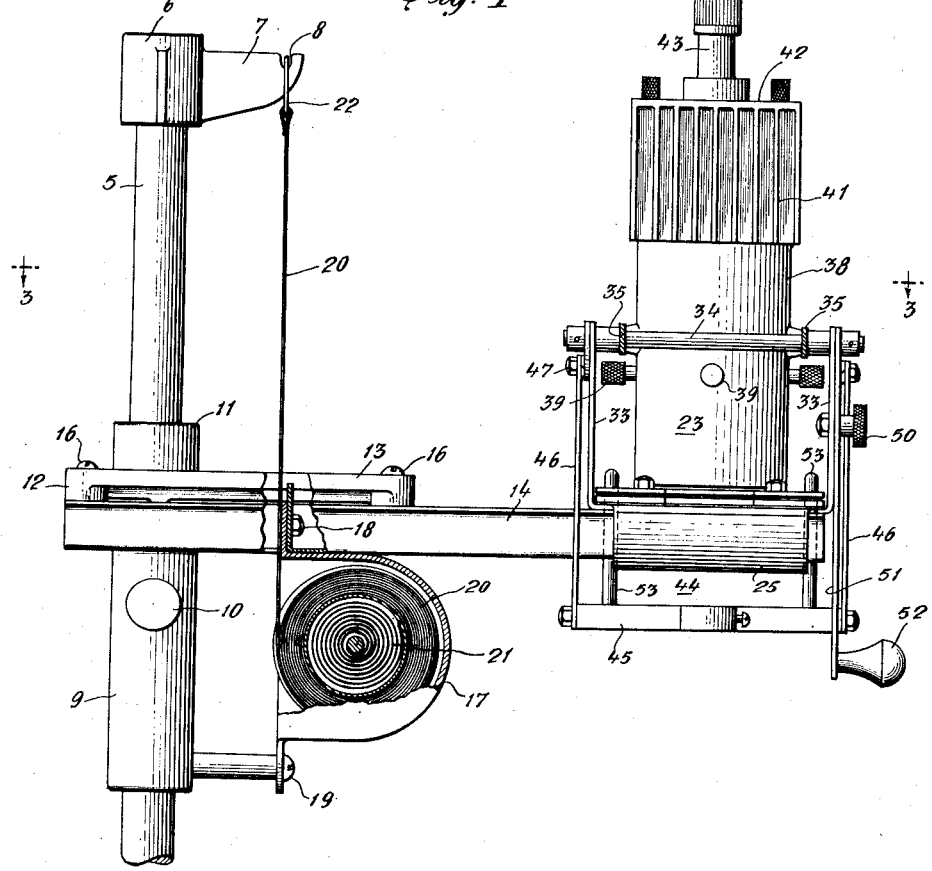

There is provided a base 1 on which is held a casing 2, which may contain a transformer to provide the desired voltage for operation of the lamp and a lead 3 extends from said casing. At the top of said casing is a boss 4 adapted to hold standard 5 therein. Suitable means for locking said standard in the boss may be provided. At the top of the standard 5 is a fitting 6 having a laterally extending arm 7, the extreme end of which has a notch 8.

Figure 3:
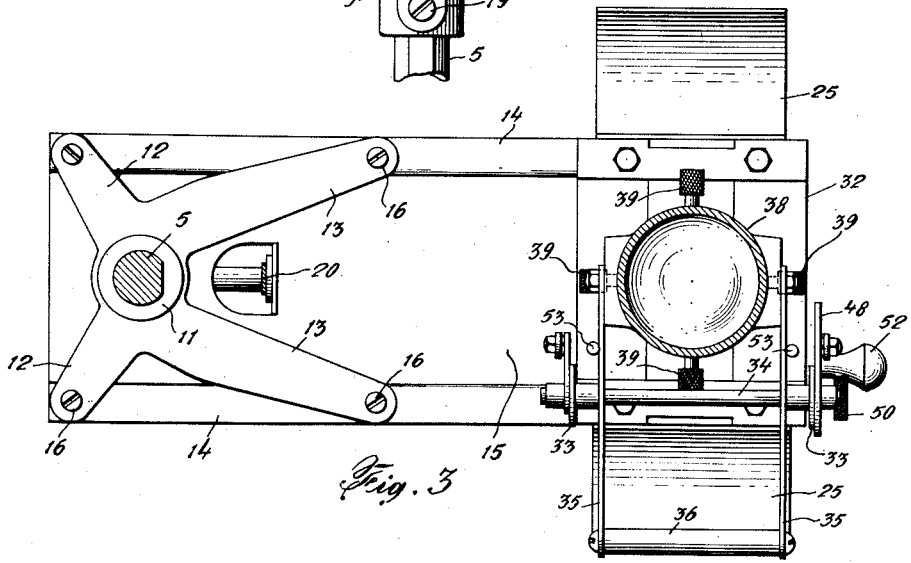
Fig. 3 is a cross-sectional view taken along the line 3—3 of Fig. 1.

A collar 9 is fitted over standard 5 and is provided with a set screw 10 for holding the same in any desired position. Usually, the standard is flattened so as to provide a better bearing surface for the set screw 10. The upper end 11 of collar 9 is provided with a pair of relatively short fingers 12 extending to one side of the standard 5 and a second set of fingers 13 of considerably greater length and extending on the opposite side of standard 5, as most clearly shown in Fig. 3. A bracket or frame 14 on either side of standard 5 and connected by a plate 15 is held in position by means of screws 16 passing through the ends of fingers 12 and 13 and being threaded into said brackets 14.

A casing 17 is secured to the collar 9 by screws 18 and 19, respectively, at the upper and lower ends of said collar. A steel tape 20 is rolled within the casing 17 and a spring 21 is provided for normally holding the same in rolled condition. The free end of tape 20 is provided with an eye 22, which is held in notch 8. By this means the weight of the enlarging head is counterbalanced and an operator is enabled to readily move the same upwardly or downwardly when desired.

At the free end of bracket members 14 is held a casing 23 containing condensing lenses. Below the same, and similarly held in brackets 14, is casing 24. A plate having concave portions 25 is also held on brackets 14 and provides space for the holding of film to be enlarged.

Said member 25 has an opening 26 therein in order to expose a suitable portion of the film. Above the member 25 is a plate 27 having an opening 28 corresponding to opening 26. It is provided at its two sides with upstanding pins 29 secured thereto. Held by the pins 29 are spring members 30 having angularly bent ends 31, as more clearly shown in Fig. 5. Normally, unless there is pressure exerted on plate 27, the springs 30 hold said plate away from contact with member 25 and thus avoids contact with and scratching of the film. It is only when casing 23 is allowed to rest upon plate 27 that the same presses upon the film and holds the same in flattened position. The pins 29 act to guide casing 23 and to cause it to assume its desired position. Side plates 32 prevent plate 27 from getting out of alignment.

Extending upwardly from brackets 14 are rigidly secured arms 33, between the upper or free ends of which is held a circular bar or axle 34. A pair of horizontal arms 35 are mounted on axle 34 adjacent to arms 33 and at one end said arms 35 are interconnected by bar 36. At the other end thereof they are held by screws 35 to lamp housing 38, which has a skirt fitting into the upper end of casing 23. Screws 39 hold the parts 23 and 38 together for normal operation. By pressing downwardly on bar 36, lamp housing 38 is lifted upwardly and thus carries casing 23 with it, so as to free plate 27 and release the film.

At the upper end of lamp housing 38 is a somewhat enlarged chamber 40, which is adapted to contain the lamp and is provided with ribs 41 at opposite sides thereof to radiate heat therefrom and thus keep the apparatus cool. A cover plate 42 is provided thereon and element 43 projects through and is movably held on cover 42. Said element 43 has connections to a source of electricity and the lower end thereof carries the lamp (not shown).

Figure 2:
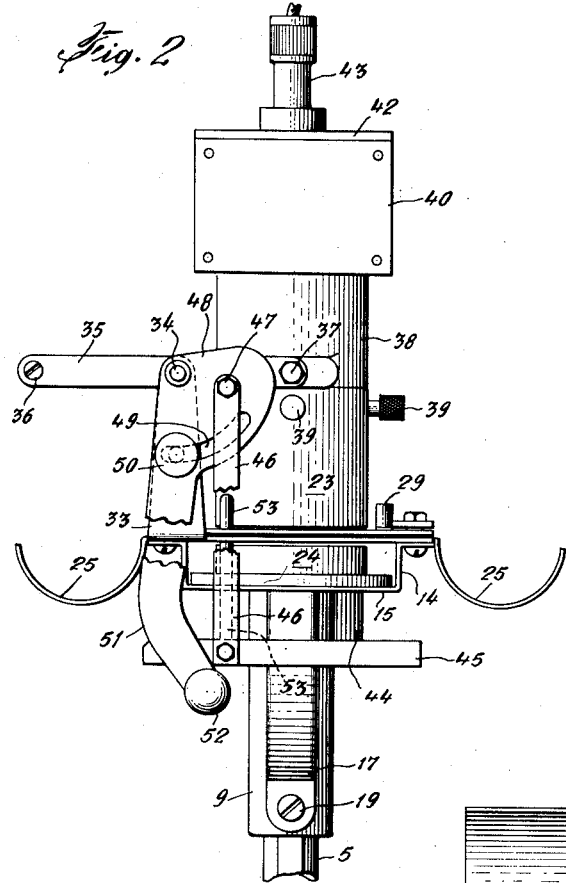
Fig. 2 is a front view of the enlarging head constituting a part of the apparatus.

A casing 44 below brackets 14 telescopes within casing 24 and is provided with a base member 45. Secured to opposite sides of said base 45 are arms 46 pivoted at 47 to one side of lever member 48, which is pivotally mounted on axle 34. Said lever is provided with an arcuate slot 49 through which passes set screw 50 into arm 33 to hold said lever 48 in adjusted position. Extending downwardly therefrom and integral therewith is operating lever 51 having a knob 52 to allow manual manipulation thereof. Mounted on base 45 is a pair of guide pins 53 on opposite sides of said base and passing through plate 15 and plates 25 and 32. Said pins 53 constitute guide means for holding casing 44 steady during movements thereof. By the movement of knob 52 to the right or left, as shown in Fig. 2, casing 44 is caused to move upwardly or downwardly, thus focusing the enlarging lens. It will be noted that lever 51 is of much greater length than the distance between 34 and 47, and therefore a very close adjustment of the lens may be obtained.

In the modification of the holding means for the support shown in Fig. 7, there is provided a collar 55 having fingers 56, similar to fingers 12 and also having fingers 57 similar to fingers 13. Below the same and in reversed relation is a similar collar 58, having fingers 59 and 60, respectively, equivalent to fingers 56 and 57 and being in alignment therewith. A pair of channel beams or girders 61, as more particularly shown in Figs. 7 and 8, are held in place by screws 60 threaded into the flanges of said girders. A plate 63 is secured to the free ends of said girders in order to make the construction more rigid. Also tending to give the same result is casing 64, which is held by screws 65 to the respective collars 55 and 58. Casing 64, which is the equivalent of casing 17 of Fig. 1, contains the counterbalance device, including tape 20.

A bellows 67 is secured to plate 63 and carries on its free end the enlarging lens (not shown) which may be adjusted in any suitable manner as indicated above. The condensing lenses 68 are held in casing 69. The upper part of casing 69 is provided with a circular opening 70 and a concentric groove 71 on opposite sides of said casing 69 plates or disks 72 are secured over openings 70 in such a manner that the flanged edge of said disk enters into groove 71 and thus provides a tortuous passage for air.

Mounted on top thereof is a relatively long cylindrical member 73 of insulating material, such as Bakelite or the like. A cap 74 is mounted on insulating member 73 and has a passage centrally located for the reception of rod 75. A set screw 77 in boss 76 holds rod 75 in adjusted position. A series of longitudinal openings 78 are provided in cap 74. A plate 79 is secured inside of the cap, as shown in Fig. 8. The lower end of rod 75 is provided with an extension 80, holding a lamp 81 and also a transparent or translucent disk 82 for the diffusion of light.

By the arrangement shown in Fig. 8, there is provided a novel and convenient ventilating arrangement, especially in an apparatus of large size wherein a considerable amount of heat is developed by the lamp 81. The members 72 and 79 allow air to flow into the lower end of casing 69, as shown by the arrows, and to pass out of the casing at the upper end thereof through opening 78, but at the same time they prevent light from lamp 81 from emanating from the apparatus. This gives a very convenient, light-proof structure which may be readily cooled. Furthermore, the member 73, being of non-conducting or insulating material, does not transmit heat from the lamp so that at no time does the apparatus become too hot for the touch.

Although I have described my invention setting forth two specific embodiments thereof, my invention is not limited thereto, as it will be apparent to those skilled in the art that various changes and modifications may be made in the details of construction without departing from the spirit of the invention. For example, the brackets 14 and girders 61 may be made of various types, shapes or sizes, and the physical forms thereof may be varied to a considerable extent. The focusing arrangement, including lever 51 and the associated parts, may be changed in various respects, as for example, instead of a lever arrangement, a set of gears may be substituted therefor, in order to give the desired up and down movement of casing 34. These and other changes may be made in my invention, the scope of which is defined in the claims appended hereto.

What I claim is:

1. In a support for a photographic enlarger having a base and a vertical standard extending upwardly therefrom, the improvement which comprises a slidable collar mounted on said standard, two sets of fingers integral with said collar, a pair of horizontal beams, one end of each being secured to fingers of both sets, one of said sets extending forwardly for a substantial distance in the direction of the opposite end of said beams, and means for mounting an enlarging head between said beams and said opposite end.

2. In a support for a photographic enlarger having a base and a vertical standard extending upwardly therefrom, the improvement which comprises a slidable collar mounted on said standard, two sets of fingers integral with said collar, a pair of horizontal beams, one end of each being secured to fingers of both sets, one of said sets extending forwardly for a substantial distance in the direction of the opposite end of said beams, the other set extending rearwardly of said standard and means for mounting an enlarging head between said beams and said opposite end.

3. In a support for a photographic enlarger having a base and a vertical standard extending upwardly therefrom, the improvement which comprises a slidable collar mounted on said standard, two sets of fingers integral with said collar, a pair of horizontal beams, one end of each being secured to fingers of both sets, one of said sets extending forwardly for a substantial distance in the direction of the opposite end of said beams, a second similar collar on said standard having two similar sets of fingers and located on the opposite side of said beams, said beams being also secured to said latter fingers, and means for mounting an enlarging head between said beams and said opposite end.

RUDOLPH SIMMON.